United States Patent
Ma et al.

(10) Patent No.: US 12,045,965 B2
(45) Date of Patent: Jul. 23, 2024

(54) DEVICE AND METHOD FOR PROCESSING VIDEO DATA, AND DISPLAY SYSTEM

(71) Applicant: BOE TECHNOLOGY GROUP CO., LTD., Beijing (CN)

(72) Inventors: Xitong Ma, Beijing (CN); Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/638,266

(22) PCT Filed: Apr. 28, 2021

(86) PCT No.: PCT/CN2021/090542
§ 371 (c)(1),
(2) Date: Feb. 25, 2022

(87) PCT Pub. No.: WO2022/226835
PCT Pub. Date: Nov. 3, 2022

(65) Prior Publication Data
US 2024/0054625 A1   Feb. 15, 2024

(51) Int. Cl.
*G06T 7/00* (2017.01)
*G06F 3/14* (2006.01)
*H04N 5/04* (2006.01)

(52) U.S. Cl.
CPC .............. *G06T 7/0002* (2013.01); *G06F 3/14* (2013.01); *H04N 5/04* (2013.01); *G06T 2207/30168* (2013.01)

(58) Field of Classification Search
None
See application file for complete search history.

(56) References Cited

U.S. PATENT DOCUMENTS

2017/0272621 A1* 9/2017 Park ..................... H04N 23/62

* cited by examiner

*Primary Examiner* — Mark T Monk
(74) *Attorney, Agent, or Firm* — HOUTTEMAN LAW LLC (57) ABSTRACT

Disclosed are a device and method for processing video data, and a display system. The device for processing video data includes: a first acquisition module, a second acquisition module, a storage module and a processing module. The first acquisition module is configured to determine, in response to receiving an image quality adjustment parameter, whether the image quality adjustment parameter meets a preset condition, and send the image quality adjustment parameter to the storage module. The storage module is configured to cache the image quality adjustment parameter, and send the image quality adjustment parameter to the processing module. The second acquisition module is configured to acquire original video data, and send the original video data to the processing module. The processing module is configured to perform data processing on the original video data according to the image quality adjustment parameter to generate target video data.

20 Claims, 4 Drawing Sheets

DEVICE AND METHOD FOR PROCESSING VIDEO DATA, AND DISPLAY SYSTEM

CROSS-REFERENCE TO RELATED APPLICATIONS

This is a National Phase Application filed under 35 U.S.C. 371 as a national stage of PCT/CN2021/090542, filed on Apr. 28, 2021, the contents of which are incorporated herein in their entirety by reference.

TECHNICAL FIELD

The present disclosure relates to the field of display technologies, and in particular, to a device and method for processing video data, and a display system.

BACKGROUND

With the continuous development of science and technology, terminal devices such as professional monitors, computers and smart phones have been widely used. In order to produce an image display effect which meets requirements of a user, when a terminal device displays an image, the image is adjusted according to an instruction input by the user. For example, a color gamut of the image is adjusted according to a color gamut switching instruction from the user; or colors of the image are adjusted according to a color adjustment instruction from the user.

SUMMARY

The present disclosure aims to solve at least one of technical problems in the prior art, and provides a device and method for processing video data, and a display system.

In order to achieve the above objective, the present disclosure provides a device for processing video data, including: a first acquisition module, a second acquisition module, a storage module and a processing module. The first acquisition module is configured to determine, in response to receiving an image quality adjustment parameter, whether the image quality adjustment parameter meets a preset condition, and send the image quality adjustment parameter to the storage module in response to the image quality adjustment parameter meeting the preset condition. The storage module is configured to cache the image quality adjustment parameter, and send the image quality adjustment parameter to the processing module in response to a frame synchronization signal. The second acquisition module is configured to acquire original video data, and send the original video data to the processing module in response to a valid data strobe signal, where a transmission time period of the image quality adjustment parameter does not overlap with that of the original video data. The processing module is configured to perform data processing on the original video data according to the image quality adjustment parameter to generate target video data.

In some embodiments, the first acquisition module includes: a receiving sub-module and a check sub-module, the receiving sub-module is configured to receive the image quality adjustment parameter sent by a system chip; and the check sub-module is configured to determine whether the image quality adjustment parameter meets the preset condition, control the receiving sub-module to send the image quality adjustment parameter to the storage module in response to the image quality adjustment parameter meeting the preset condition, and send a data request signal to the system chip in response to the image quality adjustment parameter doing not meet the preset condition, to make the system chip resend the image quality adjustment parameter.

In some embodiments, the image quality adjustment parameter is serial data including: a first keyword, at least one piece of valid data, a second keyword and a check value, which are arranged in sequence, where the check value is obtained by performing a first operation on the first keyword, the second keyword and the valid data therebetween; and the check sub-module is configured to perform a second operation on the first keyword, the second keyword, the valid data therebetween and the check value in the received image quality adjustment parameter, compare a result of the second operation with a target value, determine that the image quality adjustment parameter meets the preset condition in response to the result of the second operation being equal to the target value, and determine that the image quality adjustment parameter does not meet the preset condition in response to the result of the second operation being not equal to the target value.

In some embodiments, the first operation includes XOR operation, and the second operation includes XOR operation.

In some embodiments, the first acquisition module receives the image quality adjustment parameter in a first clock domain, and the device further includes: a timing generation module configured to generate the frame synchronization signal and the valid data strobe signal in a second clock domain, where a preset time interval is arranged between start time of a valid state of the frame synchronization signal and start time of a valid state of the valid data strobe signal, and a clock rate of the second clock domain is greater than that of the first clock domain; and where the storage module is configured to cache the image quality adjustment parameter, and send, from the start time of the valid state of the frame synchronization signal, the image quality adjustment parameter to the processing module in a third clock domain, and a clock rate of the third clock domain is greater than that of the second clock domain.

In some embodiments, the storage module includes: a pulse generator and a first memory, the first memory is configured to store the image quality adjustment parameter; and the pulse generator is configured to generate a pulse signal in the third clock domain, where the pulse signal is configured to control the first memory to output the image quality adjustment parameter to the processing module, a frequency of the pulse signal is the same as that of the frame synchronization signal, and a rising edge of the pulse signal is the same as the start time of the valid state of the frame synchronization signal.

In some embodiments, the pulse generator includes: a first generation unit and a second generation unit, the first generation unit is configured to delay the frame synchronization signal by a first time to obtain a delayed signal, where the first time is equal to a single clock pulse width of the third clock domain; and the second generation unit is configured to invert the delayed signal, and perform AND operation on the inverted delayed signal together with the frame synchronization signal to obtain the pulse signal.

In some embodiments, the second acquisition module includes: a receiver, a write memory controller and a read memory controller, the receiver is configured to receive the original video data in a fourth clock domain; the write memory controller is configured to write the original video data to a second memory in a fifth clock domain; and the read memory controller is configured to read the original video data from the second memory in the fifth clock domain and send the original video data to the processing module in the second clock domain.

The present disclosure further provide a display system, including: a display module, a system chip, and the device for processing video data described above, the system chip is configured to output a corresponding image quality adjustment parameter in response to an image quality adjustment instruction; and the display module is configured to perform displaying in response to target video data output by the device for processing video data.

The present disclosure further provides a method for processing video data applied to a device for processing video data, where the device for processing video data includes: a first acquisition module, a second acquisition module, a storage module and a processing module, and the method includes: determining, by the first acquisition module, in response to receiving an image quality adjustment parameter, whether the image quality adjustment parameter meets a preset condition, and sending the image quality adjustment parameter to the storage module in response to the image quality adjustment parameter meeting the preset condition; caching, by the storage module, the image quality adjustment parameter, and sending, in response to a frame synchronization signal, the image quality adjustment parameter to the processing module; acquiring, by the second acquisition module, original video data, and sending, in response to a valid data strobe signal, the original video data to the processing module, where a transmission time period of the image quality adjustment parameter does not overlap with that of the original video data; and performing, by the processing module, data processing on the original video data according to the image quality adjustment parameter to generate target video data.

In some embodiments, the first acquisition module includes: a receiving sub-module and a check sub-module, and the operation of determining, by the first acquisition module, in response to receiving the image quality adjustment parameter, whether the image quality adjustment parameter meets the preset condition, and sending the image quality adjustment parameter to the storage module in response to the image quality adjustment parameter meeting the preset condition includes: receiving, by the receiving sub-module, the image quality adjustment parameter sent by a system chip; and determining, by the check sub-module, whether the image quality adjustment parameter meets the preset condition, controlling, in response to the image quality adjustment parameter meeting the preset condition, the receiving sub-module to output the image quality adjustment parameter to the storage module, and sending, in response to the image quality adjustment parameter doing not meet the preset condition, a data request signal to the system chip, to make the system chip resend the image quality adjustment parameter.

In some embodiments, the image quality adjustment parameter is serial data including: a first keyword, at least one piece of valid data, a second keyword and a check value, which are arranged in sequence, where the check value is obtained by performing a first operation on the first keyword, the second keyword and the valid data therebetween, and the operation of determining, by the check sub-module, whether the image quality adjustment parameter meets the preset condition includes: performing, by the check sub-module, a second operation on the first keyword, the second keyword, the valid data therebetween and the check value in the received image quality adjustment parameter; comparing a result of the second operation with a target value; determining, in response to the result of the second operation being equal to the target value, that the image quality adjustment parameter meets the preset condition; and determining, in response to the result of the second operation being not equal to the target value, that the image quality adjustment parameter does not meet the preset condition.

In some embodiments, the first operation includes XOR operation, and the second operation includes XOR operation.

In some embodiments, the first acquisition module receives the image quality adjustment parameter in a first clock domain, and the device further includes: a timing generation module, where both of the frame synchronization signal and the valid data strobe signal are generated by the timing generation module in a second clock domain, a preset time interval is arranged between start time of a valid state of the frame synchronization signal and start time of a valid state of the valid data strobe signal, and a clock rate of the second clock domain is greater than that of the first clock domain, and the operation of caching, by the storage module, the image quality adjustment parameter, and sending, in response to the frame synchronization signal, the image quality adjustment parameter to the processing module includes: caching, by the storage module, the image quality adjustment parameter, and sending, from the start time of the valid state of the frame synchronization signal, the image quality adjustment parameter to the processing module in a third clock domain, where a clock rate of the third clock domain is greater than that of the second clock domain.

In some embodiments, the storage module includes: a pulse generator and a first memory, and the operation of caching, by the storage module, the image quality adjustment parameter, and sending, from the start time of the valid state of the frame synchronization signal, the image quality adjustment parameter to the processing module in the third clock domain includes: storing, by the first memory, the image quality adjustment parameter; and generating, by the pulse generator, a pulse signal in the third clock domain, where the pulse signal is configured to control the first memory to output the image quality adjustment parameter to the processing module, a frequency of the pulse signal is the same as that of the frame synchronization signal, and a rising edge of the pulse signal is the same as the start time of the valid state of the frame synchronization signal.

In some embodiments, the operation of generating, by the pulse generator, the pulse signal in the third clock domain includes: delaying, by the pulse generator, the frame synchronization signal by a first time to obtain a delayed signal; inverting the delayed signal; and performing AND operation on the inverted delayed signal together with the frame synchronization signal to obtain the pulse signal, where the first time is equal to a single clock pulse width of the third clock domain.

In some embodiments, the second acquisition module includes: a receiver, a write memory controller and a read memory controller, and the operation of acquiring, by the second acquisition module, the original video data, and sending, in response to the valid data strobe signal, the original video data to the processing module includes: receiving, by the receiver, the original video data in a fourth clock domain; writing, by the write memory controller, the original video data to a second memory in a fifth clock domain; and reading, by the read memory controller, the original video data from the second memory in the fifth clock domain, and sending the original video data to the processing module in the second clock domain.

BRIEF DESCRIPTION OF DRAWINGS

The drawings are intended to provide a further understanding of the present disclosure, and constitute a part of the specification. The drawings are used to explain the present disclosure in conjunction of the specific embodiments below, but do not constitute any limitation to the present disclosure. In the drawings.

DETAIL DESCRIPTION OF EMBODIMENTS

Specific embodiments of the present disclosure are described in detail below with reference to the drawings. It should be understood that the specific embodiments described herein are merely used to illustrate and explain the present disclosure, rather than limiting the present disclosure.

Unless otherwise defined, technical terms or scientific terms used herein should have general meanings that are understood by those of ordinary skills in the technical field of the present disclosure. The words "first", "second" and the like used herein do not denote any order, quantity or importance, but are just used to distinguish between different elements. Similarly, the words "include", "comprise" and the like indicate that an element or object before the words covers the elements or objects or the equivalents thereof listed after the words, rather than excluding other elements or objects.

When a display device is operating, a displayed image can be processed such as being subjected to color gamut adjustment or GAMA adjustment according to user needs. Taking the color gamut adjustment as an example, a terminal device can adjust a color gamut of an image to be adjusted with 3D LUT (Look Up Table) technology. Specifically, based on an original pixel value of each pixel in the image to be adjusted, a target pixel value of each pixel is obtained according to data in a lookup table, and then an adjusted image is displayed according to the target pixel value of each pixel.

In general, a color gamut adjustment parameter (i.e., the data in the 3D LUT) is transmitted in a heterogeneous system. Specifically, the heterogeneous system includes a system chip and a Field-Programmable Gate Array (FPGA); and when the system chip receives a color gamut adjustment instruction from the user, the color gamut adjustment parameter is output to the FPGA through a Serial Peripheral Interface (SPI). Since the color gamut adjustment parameter have a relatively large data size and thus take the time of several frames for transmission, and the color gamut adjustment parameter is dynamically updated, thus pixels in some regions of a frame of image may be adjusted according to an original color gamut adjustment parameter while pixels in other regions of the same frame of image may be adjusted according to an updated color gamut adjustment parameter, resulting in inconsistent display effects of the different regions of the same frame of image.

Figure 1:
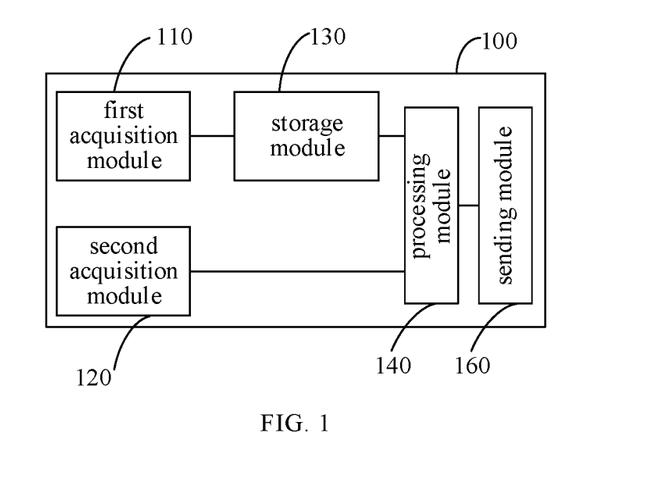
FIG. 1 is a schematic diagram of a device for processing video data according to the present disclosure.

FIG. 1 is a schematic diagram of a device for processing video data according to the present disclosure. Optionally, the device 100 for processing video data may be integrated in an FPGA. As shown in FIG. 1, the device 100 for processing video data includes: a first acquisition module 110, a second acquisition module 120, a storage module 130, and a processing module 140.

The first acquisition module 110 is configured to determine, in response to receiving an image quality adjustment parameter, whether the image quality adjustment parameter meets a preset condition, and send the image quality adjustment parameter to the storage module 130 when the image quality adjustment parameter meets the preset condition.

The image quality adjustment parameter may be sent to the device for processing video data by a system chip. For example, the system chip generates the image quality adjustment parameter when receiving an image quality adjustment instruction input by a user. The image quality adjustment instruction may be a color gamut adjustment instruction, a Gama adjustment instruction and the like. The image quality adjustment parameter may be a parameter corresponding to the Gama adjustment instruction, or a parameter corresponding to the color gamut adjustment instruction. Taking a case where the image quality adjustment instruction is the color gamut adjustment instruction as an example, the color gamut adjustment instruction may include: a first color gamut adjustment instruction for adjustment a color gamut of an image to a first color gamut, a second color gamut adjustment instruction for adjustment the color gamut of the image to a second color gamut, and a third color gamut adjustment instruction for adjustment the color gamut of the image to a third color gamut. The color gamut adjustment parameter output by the system chip may vary for different color gamut adjustment instructions.

The first acquisition module 110 may receive the image quality adjustment parameter sent by the system chip through an SPI interface. The SPI interface may transmit the image quality adjustment parameter in a first clock domain (i.e., an SPI clock domain). The first clock domain is configured to generate a first reference signal which is a clock signal, and the SPI interface performs data transmission in response to a rising edge (a falling edge, a high state, or a low state) of the first reference signal. Therefore, a data transmission rate in the first clock domain is related to a clock rate of the first reference signal.

The storage module 130 is configured to store the image quality adjustment parameter, and send the image quality adjustment parameter to the processing module 140 in response to a frame synchronization signal. The frame synchronization signal may be generated in a local clock domain, and a period of the frame synchronization signal is a display period of each frame of image in a video. In addition, "send the image quality adjustment parameter to the processing module 140 in response to a frame synchronization signal" refers to starting to send the image quality adjustment parameter to the processing module 140 from start time of a valid state of the frame synchronization signal, from end time of the valid state of the frame synchronization signal, or from a moment between the start time and the end time of the valid state of the frame synchronization signal, until the image quality adjustment parameter is totally sent. For example, the valid state is a high state.

The second acquisition module 120 is configured to acquire original video data and transmit the original video data to the processing module 140 in response to a valid data strobe signal. The original video data may be sent to the device 100 for processing video data by a video source, and a preset time interval is arranged between start time of a valid state of the valid data strobe signal and the start time of the valid state of the frame synchronization signal. The preset time interval is a frame blanking phase of the display period of each frame of image. A transmission time period of the image quality adjustment parameter does not overlap with that of the original video data.

In some embodiments, the image quality adjustment parameter may be transmitted to the processing module 140 in the local clock domain or in a high-speed clock domain with a higher clock rate.

The processing module 140 is configured to perform data processing on the original video data according to the image quality adjustment parameter to generate target video data. The target video data may be sent to a display module through a sending module 160 for the display module to perform displaying accordingly. The sending module 160 may send data with the V-BY-ONE standard.

It should be noted that the time when the processing module 140 receives the image quality adjustment parameter is different from the time when the processing module 140 receives the original video data, and after receiving the image quality adjustment parameter, the processing module 140 may store the image quality adjustment parameter and process subsequently received original video data according to the stored image quality adjustment parameter. In some time periods, the processing module 140 may only receive the original video data including multi-frame image data, without receiving the image quality adjustment parameter. In such case, the processing module 140 may process the original video data according to currently stored image quality adjustment parameter.

In some exemplary embodiments, the image quality adjustment parameter is a parameter required for performing color gamut adjustment with the 3D LUT, and the processing module 140 may perform three-dimensional interpolation processing on the original video data according to the image quality adjustment parameter.

In the embodiments of the present disclosure, after the image quality adjustment parameter output by the system chip are sent to the device 100 for processing video data, the storage module 130 caches the received image quality adjustment parameter, and then sends the image quality adjustment parameter to the processing module 140 under the control of the frame synchronization signal; and the second acquisition module 120 sends the original video data to the processing module 140 under the control of the valid data strobe signal, and the transmission time period of the image quality adjustment parameter does not overlap with that of the original video data, so that the processing module 140 may perform processing based on the same image quality adjustment parameter while processing a same frame of video image, which ensures consistent display effects in different regions of the same frame of video image.

Figure 2:
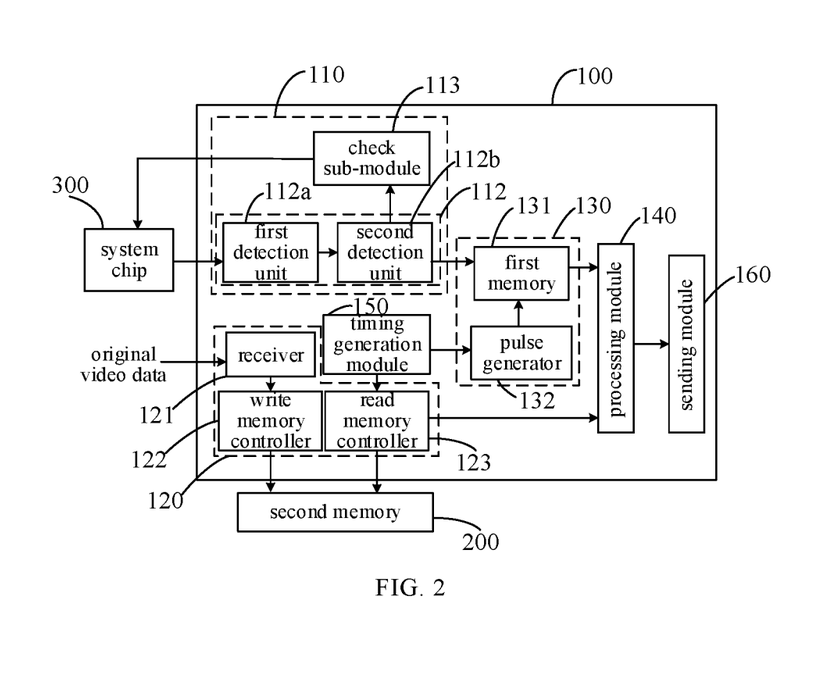
FIG. 2 is another schematic diagram of a device for processing video data according to the present disclosure.

FIG. 2 is another schematic diagram of a device for processing video data according to the present disclosure. As shown in FIG. 2, the first acquisition module 110 includes a receiving sub-module 112 and a check sub-module 113.

The receiving sub-module 112 is configured to receive the image quality adjustment parameter sent by the system chip.

Figure 3:
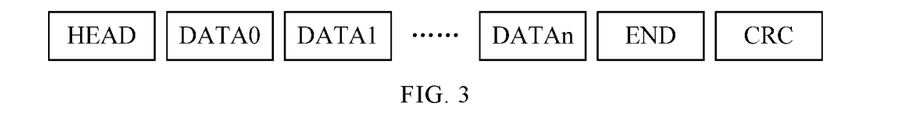
FIG. 3 is a schematic diagram illustrating composition of an image quality adjustment parameter according to the present disclosure.

Optionally, the image quality adjustment parameter is serial data, and FIG. 3 is a schematic diagram illustrating composition of the image quality adjustment parameter. As shown in FIG. 3, the image quality adjustment parameter is sequentially arranged as follows: a first keyword HEAD, at least one piece of valid data (DATA0 to DATAn), a second keyword END and a check value CRC. The check value CRC is generated by the system chip and is obtained by performing a first operation on the first keyword HEAD, the second keyword END and the valid data DATA0 to DATAn between the first keyword and the second keyword.

The receiving sub-module 112 may include: a first detection unit 112a configured to detect the first keyword in the serial data; and a second detection unit 112b configured to detect the second keyword in the serial data. After detecting the first and second keywords, the receiving sub-module 112 may further determine the valid data between the first keyword and the second keyword and the check value after the second keyword.

Illustratively, in order to distinguish between the first keyword, the second keyword and the valid data in the serial data, a bit-width of an image quality adjustment parameter may be set to 32 bits; a bit-width of the valid data is set to 30 bits, and "0" is added to each of two higher bits of the valid data, and two of "01", "10" and "11" are respectively selected for two higher bits of the first keyword and two higher bits of the second keyword. For example, the first keyword is a 32-bit hexadecimal number: FFFF_FFFF_FFFF_FFFF; and the second keyword is a 32-bit hexadecimal number: 7FFF_FFFF_FFFF_FFFF.

Illustratively, the first operation includes XOR operation. That is, the check value CRC=HEAD^DATA0^DATA1 . . . ^DATAn^END.

The check sub-module 113 is configured to determine whether the image quality adjustment parameter meets the preset condition, control the receiving sub-module 112 to output the image quality adjustment parameter to the storage module 130 when the image quality adjustment parameter meets the preset condition, and send a data request signal to a system chip 300 when the image quality adjustment parameter does not meet the preset condition, to make the system chip 300 resend the image quality adjustment parameter.

Optionally, the check sub-module 113 is configured to perform a second operation on the first keyword, the second keyword, the valid data therebetween and the check value in the received image quality adjustment parameter, compare a result of the second operation with a target value, determine, when the result of the second operation is equal to the target value, that the image quality adjustment parameter meets the preset condition, and determine, when the result of the second operation is not equal to the target value, that the image quality adjustment parameter does not meet the preset condition, that is, determine that a transmission error occurs in the transmission of the image quality adjustment parameter, and send the data request signal to the system chip 300 to request the system chip 300 to resend the image quality adjustment parameter.

The second operation includes XOR operation. The result of the second operation is denoted by CRC', i.e., CRC'=HEAD^DATA0^DATA1 . . .
^DATAn^END^CRC When the first operation is XOR operation, CRC'=CRC^CRC=0 if the image quality adjustment parameter is correctly transmitted. Therefore, in some embodiments, the target value may be set to 0 when each of the first operation and the second operation is XOR operation.

In some embodiments, as shown in FIG. 2, the device 100 for processing video data further includes a timing generation module 150 configured to generate the frame synchronization signal and the valid data strobe signal in a second clock domain (i.e., the local clock domain described above). A preset time interval is arranged between the start time of the valid state of the frame synchronization signal and the start time of the valid state of the valid data strobe signal, and a clock rate of the second clock domain is greater than that of the first clock domain. For example, the start time of the valid state of the frame synchronization signal may be a rising edge of the frame synchronization signal, and the preset time interval between the start time of the valid state of the frame synchronization signal and the start time of the valid state of the valid data strobe signal is a frame blanking phase of the display period of a frame of image. The second clock domain is configured to generate a second reference signal which is a clock signal, and the timing generation module 150 may generate the frame synchronization signal and the valid data strobe signal according to the second reference signal; and the sending module 160 may send the target video data to the display module also according to the second reference signal. For example, the second reference signal is generated by a local oscillator, for example, when an $m^{th}$ second reference signal generated by the local oscillator is at a rising edge (or a falling edge), the frame synchronization signal is at a rising edge; and when an $n^{th}$ second reference signal generated by the local oscillator is at a rising edge (or a falling edge), the frame synchronization signal is at a falling edge, where m>n, and m and n are both integers.

Signal timing output by the timing generation module 150 is illustrated by Table 1 below, where 1VCLK represents a duration of one clock in the second clock domain; and 1Line represents time for displaying one line.

TABLE 1

| Timing parameter | Value | |
| --- | --- | --- |
| HTT (period of line synchronization signal) | 2200 | (unit: 1VCLK) |
| HAC (effective display time in a line) | 1920 | (unit: 1VCLK) |
| HFP (front porch of line synchronization signal) | 88 | (unit: 1VCLK) |
| HSW (pulse width of line synchronization signal) | 44 | (unit: 1VCLK) |
| HBP (back porch of line synchronization signal) | 148 | (unit: 1VCLK) |
| VTT (period of frame synchronization signal) | 1125 | (unit: 1Line) |
| VAC (effective display time in display period) | 1080 | (unit: 1Line) |
| VFP (front porch of frame synchronization signal) | 4 | (unit: 1Line) |
| VSW (width of frame synchronization signal) | 5 | (unit: 1Line) |
| VBP (back porch of frame synchronization signal) | 36 | (unit: 1Line) |

The storage module 130 sends the image quality adjustment parameter to the processing module 140 in a third clock domain from the start time of the valid state of the frame synchronization signal, and the third clock domain is configured to generate a third reference signal which is a clock signal; and the storage module 130 may perform data transmission in response to a rising edge (a falling edge, a high state, or a low state) of the third reference signal in the third clock domain, so that a data transmission rate in the third clock domain is related to a clock rate of the third reference signal. The clock rate of the third clock domain is greater than that of the second clock domain. For example, the clock rate of the third clock domain is twice that of the second clock domain. By sending the image quality adjustment parameter in the third clock domain, it may be ensured that transmission of the image quality adjustment parameter may be completed in the frame blanking phase.

Figure 4:
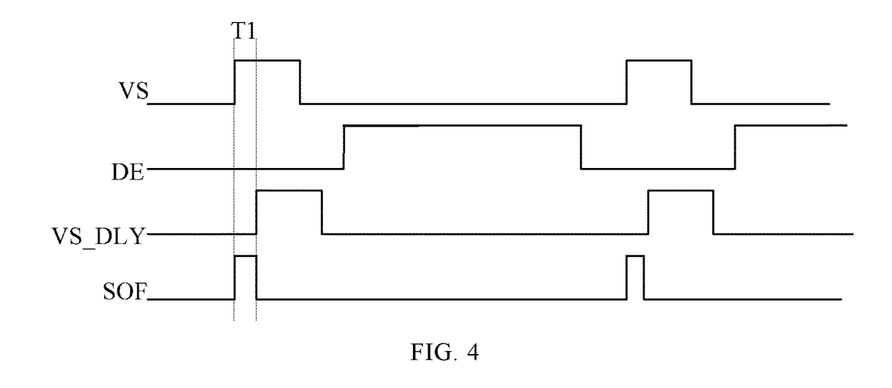
FIG. 4 is a waveform diagram of some signals according to the present disclosure.

The start time of the valid state of the frame synchronization signal may be the rising edge, but since it is hard for the storage module 130 to directly detect an edge of a signal according to an actual circuit design, a pulse signal may be generated according to the frame synchronization signal in the third clock domain in practical applications, and the image quality adjustment parameter may be sent under the control of the pulse signal. Specifically, the storage module 130 includes a pulse generator 132 and a first memory 131 which may be a random access memory (RAM). The pulse generator 132 is configured to generate the pulse signal in the third clock domain, and the pulse signal is configured to control the first memory 131 to output the image quality adjustment parameter to the processing module 140. FIG. 4 is a waveform diagram of some signals according to the present disclosure. As shown in FIG. 4, DE is the valid data strobe signal. A frequency of the pulse signal SOF is the same as that of the frame synchronization signal VS, and a rising edge of the pulse signal SOF is the same as the start time of the valid state of the frame synchronization signal VS; and a clock rate of the third clock domain is greater than that of the second clock domain.

Optionally, the pulse generator 132 includes a first generation unit and a second generation unit. The first generation unit is configured to delay the frame synchronization signal VS by a first time T1 to obtain a delayed signal VS_DLY (as shown in FIG. 4), and the first time T1 is equal to a single clock pulse width of the third clock domain. The second generation unit is configured to invert the delayed signal VS_DLY, and then perform AND operation on the inverted delayed signal VS_DLY together with the frame synchronization signal VS to obtain the pulse signal SOF.

It should be noted that the frame synchronization signal VS and the delayed signal VS_DLY are both signals switched between a high state and a low state, and inverting the signal means interchanging the high state and the low state of the signal. Performing AND operation on the two signals to obtain the pulse signal refers to that the pulse signal SOF is in a high state in a phase when the two signals are both in the high state, and the pulse signal SOF is in a low state in the other phases.

In some embodiments, the second acquisition module 120 includes: a receiver 121, a write memory controller 122, and a read memory controller 123.

The receiver 121 is configured to receive the original video data in a fourth clock domain. The receiver 121 receives the original video data through a serial digital interface (SDI) and converts the received serial data into parallel video data.

The fourth clock domain is a clock domain of the video source, and is configured to generate a fourth reference signal which is a clock signal. The video source performs data transmission in response to a rising edge (a falling edge, a high state, or a low state) of the fourth reference signal, so that a data transmission rate in the fourth clock domain is related to a clock rate of the fourth reference signal.

The write memory controller 122 is configured to write the original video data to a second memory 200 in a fifth clock domain. For example, the second memory 200 is a Double Data Rate (DDR) memory, and the fifth clock domain is a read/write clock domain of the DDR memory.

The read memory controller 123 is configured to read the original video data from the second memory in the fifth clock domain when the valid data strobe signal reaches the valid state, and send the original video data to the processing module 140 in the second clock domain.

The fifth clock domain is configured to generate a fifth reference signal which is a clock signal, and the write memory controller 122 writes data to the second memory in response to a rising edge (a falling edge, a high state, or a low state) of the fifth reference signal; and the read memory controller 123 performs data reading in response to a rising edge (a falling edge, a high state, or a low state) of the fifth reference signal. Therefore, a data read rate and a data write rate in the fifth clock domain are related to a clock rate of the fifth reference signal.

Since the original video data from the video source is transmitted to the receiver 121 in the fourth clock domain and the original video data received by the processing module 140 is transmitted in the second clock domain, the original video data needs to be transmitted across the clock domains when transmitted from the video source to the processing module 140. Data transmission across the clock domains can be realized with the read memory controller 123 and the write memory controller 122. In addition, the device 100 for processing video data may further include a switching module configured to acquire, when the receiver 121 does not receive the original video data, pre-stored preset image data from the second memory 200 or other positions, and output the pre-stored preset image data to the processing module 140 or directly send the pre-stored preset image data to the display module through the sending module 160, so that the display module may still display a preset image when the device 100 for processing video data receives no video data. The preset image may be configured to inform the user that there is no input data currently.

Figure 5:
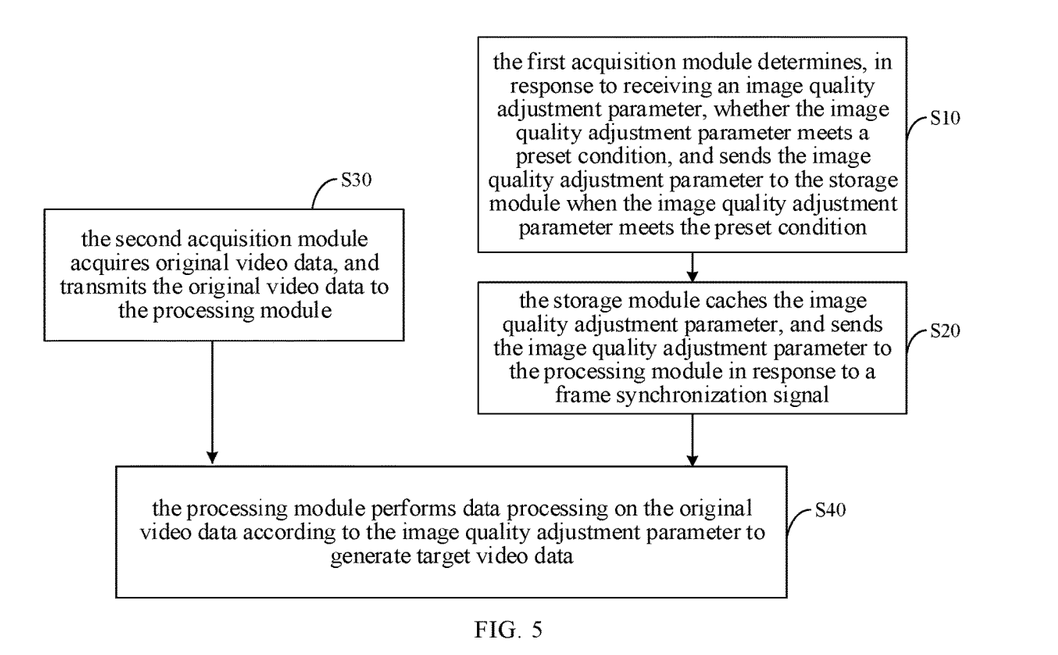
FIG. 5 is a schematic diagram illustrating a method for processing video data according to the present disclosure.

FIG. 5 is a schematic diagram illustrating a method for processing video data according to the present disclosure, and the method for processing video data is applied to the above device 100 for processing video data. As shown in FIG. 2 and FIG. 5, the method for processing video data includes operations S10 to S40.

In S10, a first acquisition module 110 determines, in response to receiving an image quality adjustment parameter, whether the image quality adjustment parameter meets a preset condition, and sends the image quality adjustment parameter to a storage module 130 when the image quality adjustment parameter meets the preset condition. In some embodiments, the image quality adjustment parameter is sent from a system chip to the first acquisition module 110, and transmitted to the first acquisition module 110 in a first clock domain. For example, the system chip sends the image quality adjustment parameter to the first acquisition module 110 through an SPI interface, and the first clock domain is an SPI clock domain.

In S20, the storage module 130 caches the image quality adjustment parameter, and sends the image quality adjustment parameter to a processing module 140 in response to a frame synchronization signal.

In S30, a second acquisition module 120 acquires original video data, and transmits the original video data to the processing module 140 in response to a valid data strobe signal. A transmission time period of the image quality adjustment parameter does not overlap with that of the original video data. In some embodiments, the frame synchronization signal and the valid data strobe signal are generated by a timing generation module 150 in a second clock domain, a preset time interval is arranged between start time of a valid state of the frame synchronization signal and start time of a valid state of the valid data strobe signal, and a clock rate of the second clock domain is greater than that of the first clock domain.

In S40, the processing module 140 performs data processing on the original video data according to the image quality adjustment parameter to generate target video data.

It should be noted that the process of the operation S30 is independent of the processes of the operations S10 and S20.

Figure 6:
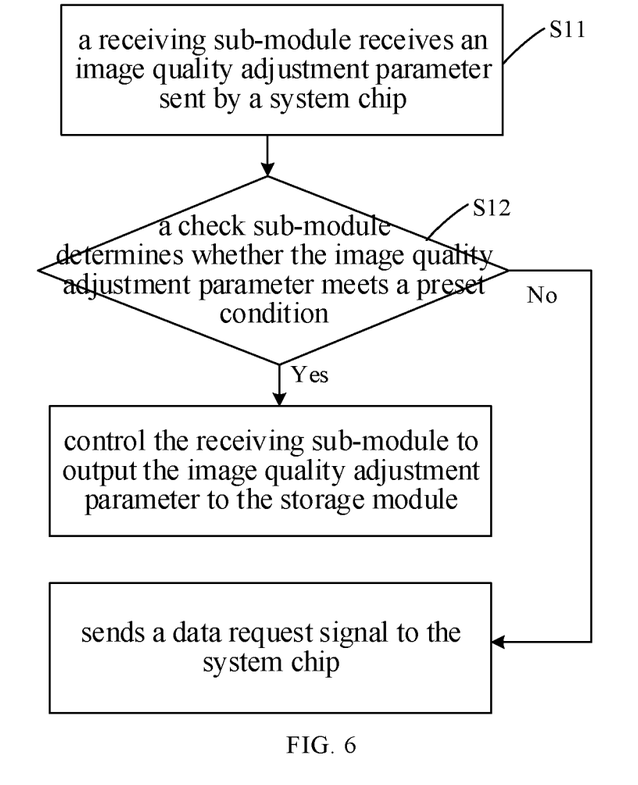
FIG. 6 is a schematic diagram of an implementation of operation S10 according to the present disclosure.

FIG. 6 is a schematic diagram of an implementation of operation S10 according to the present disclosure. As shown in FIG. 6, in some embodiments, the operation S10 includes operations S11 and S12.

In S11, a receiving sub-module 112 receives the image quality adjustment parameter sent by the system chip.

In S12, a check sub-module 113 determines whether the image quality adjustment parameter meets the preset condition, controls the receiving sub-module 112 to output the image quality adjustment parameter to the storage module 130 when the image quality adjustment parameter meets the preset condition, and sends a data request signal to the system chip 300 when the image quality adjustment parameter does not meet the preset condition, to make the system chip 300 resend the image quality adjustment parameter.

The image quality adjustment parameter is serial data including: a first keyword, at least one piece of valid data, a second keyword and a check value, which are arranged in sequence; and the check value is obtained by performing a first operation on the first keyword, the second keyword and the valid data therebetween. In this case, the operation S12 includes: performing, by the check sub-module 113, a second operation on the first keyword, the second keyword, the valid data therebetween, and the check value in the received image quality adjustment parameter; comparing, by the check sub-module 113, a result of the second operation with a target value; determining, by the check sub-module 113, that the image quality adjustment parameter meets the preset condition when the result of the second operation is equal to the target value; and determining, by the check sub-module 113, that the image quality adjustment parameter does not meet the preset condition when the result of the second operation is not equal to the target value.

Each of the first operation and the second operation may be XOR operation.

The operation S20 includes: S20a, sending, by the storage module 130, from start time of a valid state of the frame synchronization signal, the image quality adjustment parameter to the processing module 140 in a third clock domain, where a clock rate of the third clock domain is greater than that of the second clock domain.

As described above, the storage module 130 includes a pulse generator 132 and a first memory 131. In this case, the operation S20a includes: storing, by the first memory 131, the image quality adjustment parameter; and generating, by the pulse generator 132, a pulse signal, which is configured to control the first memory 131 to output the image quality adjustment parameter to the processing module 140, in the third clock domain. A frequency of the pulse signal is the same as that of the frame synchronization signal, a rising edge of the pulse signal is the same as the start time of the valid state of the frame synchronization signal, and a clock rate of the third clock domain is greater than that of the second clock domain.

Generating, by the pulse generator 132, the pulse signal in the third clock domain includes: delaying, by the pulse generator 132, the frame synchronization signal by a first time to obtain a delayed signal; inverting the delayed signal; and performing AND operation on the inverted delayed signal together with the frame synchronization signal to obtain the pulse signal. The first time is equal to a single clock pulse width of the third clock domain.

In some embodiments, the operation S30 includes: receiving, by a receiver 121, the original video data in a fourth clock domain; writing, by a write memory controller 122, the original video data to a second memory 200 in a fifth clock domain; and reading, by a read memory controller 123, the original video data from the second memory in the fifth clock domain, and sending, by the read memory controller 123, the original video data to the processing module 140 in the second clock domain.

The process of performing data processing by the device 100 for processing video data is described above, and thus is not repeated here.

Figure 7:
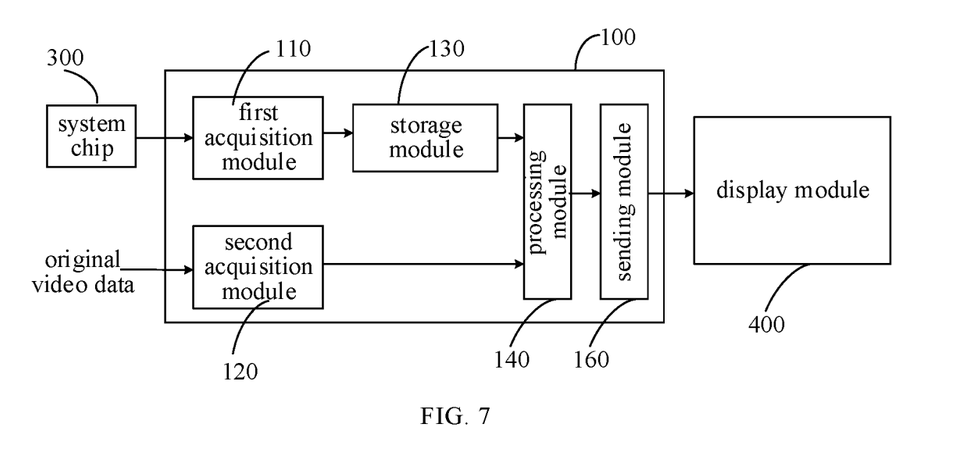
FIG. 7 is a schematic diagram of a display system according to the present disclosure.

FIG. 7 is a schematic diagram of a display system according to the present disclosure, and the display system may be a terminal device such as a monitor system, a computer, or a smart phone. As shown in FIG. 7, the display system includes: a display module 400, a system chip 300, and the device 100 for processing video data described above.

The system chip 300 is configured to output corresponding image quality adjustment parameter in response to an image quality adjustment instruction.

The display module 400 is configured to perform displaying in response to target video data output by the device 100 for processing video data. The display module 400 includes a display panel and a driving circuit configured to supply a driving signal to the display panel according to the target video data, so as to control the display panel to perform displaying.

Figure 8:
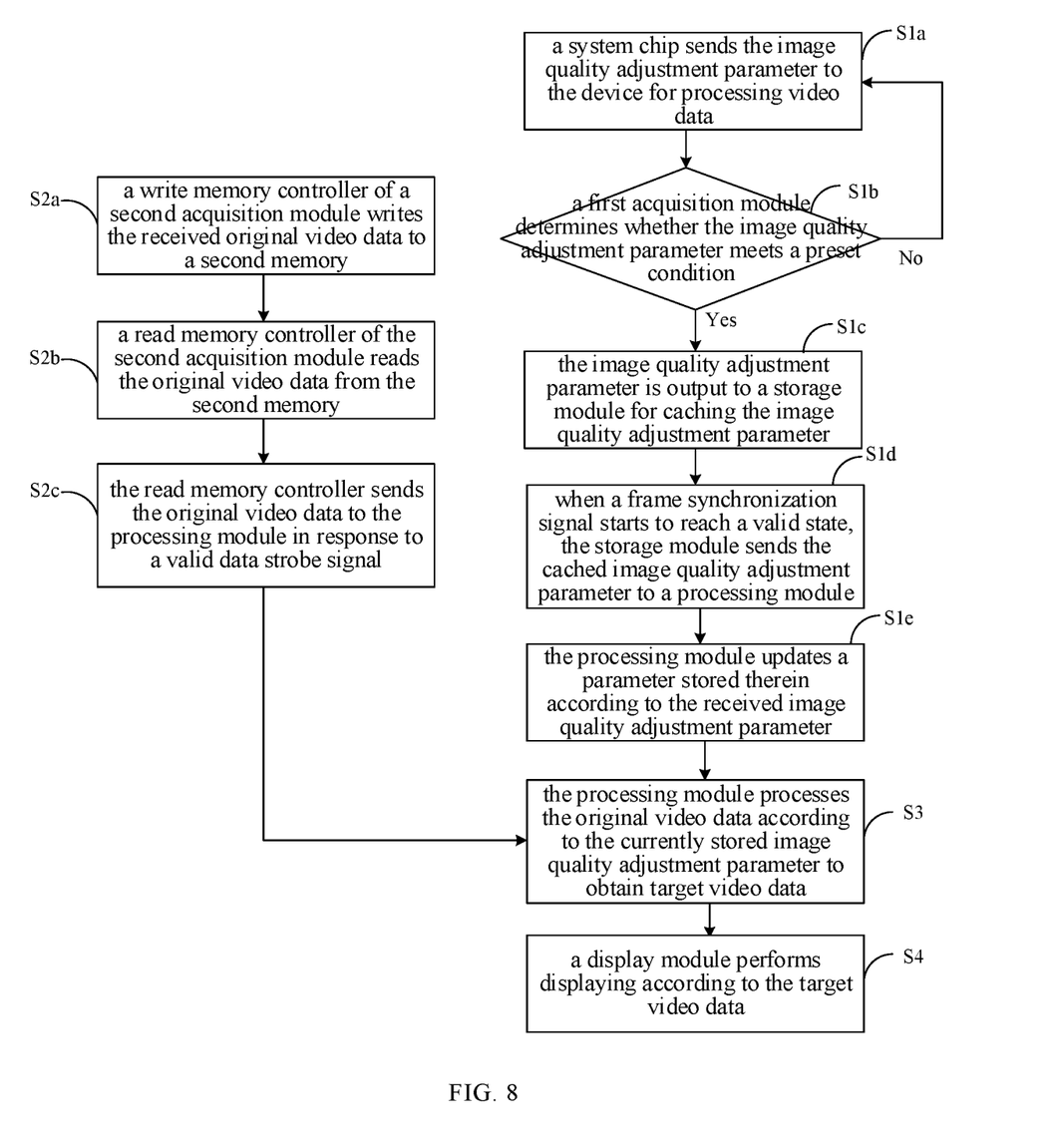
FIG. 8 is a schematic diagram illustrating a display process of a display system according to the present disclosure.

FIG. 8 is a schematic diagram illustrating a display process of a display system according to the present disclosure. As shown in FIG. 8, the display process includes the following operations.

When a system chip 300 receives an image quality adjustment instruction, the system chip 300 performs operation S1a: sending the image quality adjustment parameter to the device 100 for processing video data.

In operation S1b, after receiving the image quality adjustment parameter, a first acquisition module 110 of the device 100 for processing video data determines whether the image quality adjustment parameter meets a preset condition, performs operation S1c when the image quality adjustment parameter meets the preset condition, and sends a data request instruction to the system chip 300 when the image quality adjustment parameter does not meet the preset condition, so that the operation S1a is performed again.

In S1c, the image quality adjustment parameter is output to a storage module 130 for caching the image quality adjustment parameter.

In S1d, when a frame synchronization signal starts to reach a valid state, the storage module 130 sends the cached image quality adjustment parameter to a processing module 140.

In S1e, the processing module 140 updates a parameter stored therein according to the received image quality adjustment parameter.

In addition, a video source sends original video data to the device 100 for processing video data, so that the device 100 for processing video data may perform operations S2a to S3.

In S2a, a write memory controller 122 of a second acquisition module 120 writes the received original video data to a second memory.

In S2b, a read memory controller 123 of the second acquisition module 120 reads the original video data from the second memory.

In S2c, the read memory controller 123 sends the original video data to the processing module 140 in response to a valid data strobe signal.

In S3, the processing module 140 processes the original video data according to the currently stored image quality adjustment parameter to obtain target video data.

In S4, a display module 400 performs displaying according to the target video data.

When the system chip receives an image quality adjustment instruction, the "currently stored image quality adjustment parameter" in the operation S3 is the image quality adjustment parameter which is sent by the system chip according to the image quality adjustment instruction; and when the system chip does not receive the image quality adjustment instruction, the processing module 140 keeps the stored image quality adjustment parameter unchanged, at this time, the video source may still send the original video data, and the processing module 140 may perform processing according to the image quality adjustment parameter which is not updated.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and those modifications and improvements are also considered to fall within the scope of the present disclosure.

What is claimed is:

1. A device for processing video data, comprising: a first acquisition module, a second acquisition module, a storage module and a processing module, wherein the first acquisition module is configured to determine, in response to receiving an image quality adjustment parameter, whether the image quality adjustment parameter meets a preset condition, and send the image quality adjustment parameter to the storage module in response to the image quality adjustment parameter meeting the preset condition;

the storage module is configured to cache the image quality adjustment parameter, and send the image quality adjustment parameter to the processing module in response to a frame synchronization signal;

the second acquisition module is configured to acquire original video data, and send the original video data to the processing module in response to a valid data strobe signal, wherein a transmission time period of the image quality adjustment parameter does not overlap with that of the original video data; and the processing module is configured to perform data processing on the original video data according to the image quality adjustment parameter to generate target video data.

2. The device of claim 1, wherein the first acquisition module comprises: a receiving sub-module and a check sub-module, the receiving sub-module is configured to receive the image quality adjustment parameter sent by a system chip; and the check sub-module is configured to determine whether the image quality adjustment parameter meets the preset condition, control the receiving sub-module to send the image quality adjustment parameter to the storage module in response to the image quality adjustment parameter meeting the preset condition, and send a data request signal to the system chip in response to the image quality adjustment parameter doing not meet the preset condition, to make the system chip resend the image quality adjustment parameter.

3. The device of claim 1, wherein the image quality adjustment parameter is serial data comprising: a first keyword, at least one piece of valid data, a second keyword and a check value, which are arranged in sequence, and the check value is obtained by performing a first operation on the first keyword, the second keyword and the valid data therebetween; and the check sub-module is configured to perform a second operation on the first keyword, the second keyword, the valid data therebetween and the check value in the received image quality adjustment parameter, compare a result of the second operation with a target value, determine that the image quality adjustment parameter meets the preset condition in response to the result of the second operation being equal to the target value, and determine that the image quality adjustment parameter does not meet the preset condition in response to the result of the second operation being not equal to the target value.

4. The device of claim 3, wherein the first operation comprises XOR operation, and the second operation comprises XOR operation.

5. The device of claim 1, wherein the first acquisition module receives the image quality adjustment parameter in a first clock domain, and the device further comprises:

a timing generation module configured to generate the frame synchronization signal and the valid data strobe signal in a second clock domain, wherein a preset time interval is arranged between start time of a valid state of the frame synchronization signal and start time of a valid state of the valid data strobe signal, and a clock rate of the second clock domain is greater than that of the first clock domain; and wherein the storage module is configured to cache the image quality adjustment parameter, and send, from the start time of the valid state of the frame synchronization signal, the image quality adjustment parameter to the processing module in a third clock domain, and a clock rate of the third clock domain is greater than that of the second clock domain.

6. The device of claim 5, wherein the storage module comprises: a pulse generator and a first memory, the first memory is configured to store the image quality adjustment parameter; and the pulse generator is configured to generate a pulse signal in the third clock domain, wherein the pulse signal is configured to control the first memory to output the image quality adjustment parameter to the processing module, a frequency of the pulse signal is the same as that of the frame synchronization signal, and a rising edge of the pulse signal is the same as the start time of the valid state of the frame synchronization signal.

7. The device of claim 6, wherein the pulse generator comprises: a first generation unit and a second generation unit, the first generation unit is configured to delay the frame synchronization signal by a first time to obtain a delayed signal, wherein the first time is equal to a single clock pulse width of the third clock domain; and the second generation unit is configured to invert the delayed signal, and perform AND operation on the inverted delayed signal together with the frame synchronization signal to obtain the pulse signal.

8. The device of claim 5, wherein the second acquisition module comprises: a receiver, a write memory controller and a read memory controller, the receiver is configured to receive the original video data in a fourth clock domain;

the write memory controller is configured to write the original video data to a second memory in a fifth clock domain; and the read memory controller is configured to read the original video data from the second memory in the fifth clock domain and send the original video data to the processing module in the second clock domain.

9. A display system, comprising: a display module, a system chip, and the device for processing video data of claim 1, wherein the system chip is configured to output a corresponding image quality adjustment parameter in response to an image quality adjustment instruction; and the display module is configured to perform displaying in response to target video data output by the device for processing video data.

10. A method for processing video data applied to a device for processing video data, wherein the device for processing video data comprises: a first acquisition module, a second acquisition module, a storage module and a processing module, and the method comprises:

determining, by the first acquisition module, in response to receiving an image quality adjustment parameter, whether the image quality adjustment parameter meets a preset condition, and sending the image quality adjustment parameter to the storage module in response to the image quality adjustment parameter meeting the preset condition;

caching, by the storage module, the image quality adjustment parameter, and sending, in response to a frame synchronization signal, the image quality adjustment parameter to the processing module;

acquiring, by the second acquisition module, original video data, and sending, in response to a valid data strobe signal, the original video data to the processing module, wherein a transmission time period of the image quality adjustment parameter does not overlap with that of the original video data; and performing, by the processing module, data processing on the original video data according to the image quality adjustment parameter to generate target video data.

11. The method of claim 10, wherein the first acquisition module comprises: a receiving sub-module and a check sub-module, and the operation of determining, by the first acquisition module, in response to receiving the image quality adjustment parameter, whether the image quality adjustment parameter meets the preset condition, and sending the image quality adjustment parameter to the storage module in response to the image quality adjustment parameter meeting the preset condition comprises:

receiving, by the receiving sub-module, the image quality adjustment parameter sent by a system chip; and determining, by the check sub-module, whether the image quality adjustment parameter meets the preset condition, controlling, in response to the image quality adjustment parameter meeting the preset condition, the receiving sub-module to output the image quality adjustment parameter to the storage module, and sending, in response to the image quality adjustment parameter doing not meet the preset condition, a data request signal to the system chip, to make the system chip resend the image quality adjustment parameter.

12. The method of claim 11, wherein the image quality adjustment parameter is serial data comprising: a first keyword, at least one piece of valid data, a second keyword and a check value, which are arranged in sequence, and the check value is obtained by performing a first operation on the first keyword, the second keyword and the valid data therebetween, and the operation of determining, by the check sub-module, whether the image quality adjustment parameter meets the preset condition comprises:
performing, by the check sub-module, a second operation on the first keyword, the second keyword, the valid data therebetween and the check value in the received image quality adjustment parameter;
comparing a result of the second operation with a target value;
determining, in response to the result of the second operation being equal to the target value, that the image quality adjustment parameter meets the preset condition; and
determining, in response to the result of the second operation being not equal to the target value, that the image quality adjustment parameter does not meet the preset condition.

13. The method of claim 12, wherein the first operation comprises XOR operation, and the second operation comprises XOR operation.

14. The method of claim 10, wherein the first acquisition module receives the image quality adjustment parameter in a first clock domain, and the device further comprises: a timing generation module,
wherein both of the frame synchronization signal and the valid data strobe signal are generated by the timing generation module in a second clock domain, a preset time interval is arranged between start time of a valid state of the frame synchronization signal and start time of a valid state of the valid data strobe signal, and a clock rate of the second clock domain is greater than that of the first clock domain, and the operation of caching, by the storage module, the image quality adjustment parameter, and sending, in response to the frame synchronization signal, the image quality adjustment parameter to the processing module comprises:
caching, by the storage module, the image quality adjustment parameter, and sending, from the start time of the valid state of the frame synchronization signal, the image quality adjustment parameter to the processing module in a third clock domain, wherein a clock rate of the third clock domain is greater than that of the second clock domain.

15. The method of claim 14, wherein the storage module comprises: a pulse generator and a first memory, and the operation of caching, by the storage module, the image quality adjustment parameter, and sending, from the start time of the valid state of the frame synchronization signal, the image quality adjustment parameter to the processing module in the third clock domain comprises:
storing, by the first memory, the image quality adjustment parameter; and
generating, by the pulse generator, a pulse signal in the third clock domain, wherein the pulse signal is configured to control the first memory to output the image quality adjustment parameter to the processing module, a frequency of the pulse signal is the same as that of the frame synchronization signal, and a rising edge of the pulse signal is the same as the start time of the valid state of the frame synchronization signal.

16. The method of claim 15, wherein the operation of generating, by the pulse generator, the pulse signal in the third clock domain comprises:
delaying, by the pulse generator, the frame synchronization signal by a first time to obtain a delayed signal;
inverting the delayed signal; and
performing AND operation on the inverted delayed signal together with the frame synchronization signal to obtain the pulse signal, wherein the first time is equal to a single clock pulse width of the third clock domain.

17. The method of claim 10, wherein the second acquisition module comprises: a receiver, a write memory controller and a read memory controller, and the operation of acquiring, by the second acquisition module, the original video data, and sending, in response to the valid data strobe signal, the original video data to the processing module comprises:
receiving, by the receiver, the original video data in a fourth clock domain;
writing, by the write memory controller, the original video data to a second memory in a fifth clock domain; and
reading, by the read memory controller, the original video data from the second memory in the fifth clock domain, and sending the original video data to the processing module in the second clock domain.

18. The method of claim 11, wherein the second acquisition module comprises: a receiver, a write memory controller and a read memory controller, and the operation of acquiring, by the second acquisition module, the original video data, and sending, in response to the valid data strobe signal, the original video data to the processing module comprises:
receiving, by the receiver, the original video data in a fourth clock domain;
writing, by the write memory controller, the original video data to a second memory in a fifth clock domain; and
reading, by the read memory controller, the original video data from the second memory in the fifth clock domain, and sending the original video data to the processing module in the second clock domain.

19. The method of claim 12, wherein the second acquisition module comprises: a receiver, a write memory controller and a read memory controller, and the operation of acquiring, by the second acquisition module, the original video data, and sending, in response to the valid data strobe signal, the original video data to the processing module comprises:
receiving, by the receiver, the original video data in a fourth clock domain;
writing, by the write memory controller, the original video data to a second memory in a fifth clock domain; and
reading, by the read memory controller, the original video data from the second memory in the fifth clock domain, and sending the original video data to the processing module in the second clock domain.

20. The method of claim 13, wherein the second acquisition module comprises: a receiver, a write memory controller and a read memory controller, and the operation of acquiring, by the second acquisition module, the original video data, and sending, in response to the valid data strobe signal, the original video data to the processing module comprises:
receiving, by the receiver, the original video data in a fourth clock domain;
writing, by the write memory controller, the original video data to a second memory in a fifth clock domain; and reading, by the read memory controller, the original video data from the second memory in the fifth clock domain, and sending the original video data to the processing module in the second clock domain.

* * * * *